United States Patent
Copeland

(10) Patent No.: US 11,443,264 B2
(45) Date of Patent: Sep. 13, 2022

(54) AGNOSTIC AUGMENTATION OF A CUSTOMER RELATIONSHIP MANAGEMENT APPLICATION

(71) Applicant: Accenture Global Solutions Limited, Dublin (IE)

(72) Inventor: Shannon Copeland, Atlanta, GA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/776,488

(22) Filed: Jan. 29, 2020

(65) Prior Publication Data
US 2021/0232996 A1    Jul. 29, 2021

(51) Int. Cl.
G06Q 10/06    (2012.01)
G06Q 10/10    (2012.01)

(52) U.S. Cl.
CPC ....... *G06Q 10/0637* (2013.01); *G06Q 10/067* (2013.01); *G06Q 10/063114* (2013.01); *G06Q 10/103* (2013.01)

(58) Field of Classification Search
CPC ....... G06Q 10/0637; G06Q 10/063114; G06Q 10/067; G06Q 10/103
USPC ........................................ 705/7.36
See application file for complete search history.

(56) References Cited

U.S. PATENT DOCUMENTS

| | | |
|---|---|---|
| 6,785,380 B2 | 8/2004 | Ribera |
| 6,829,603 B1 | 12/2004 | Chai et al. |
| 7,275,083 B1 | 9/2007 | Seibel et al. |
| 7,486,785 B2 | 2/2009 | Flores |
| 7,774,378 B2 | 8/2010 | Nelson |
| 7,962,361 B2 | 6/2011 | Ramchandani et al. |
| 7,966,369 B1 | 6/2011 | Briere et al. |
| 8,108,237 B2 | 1/2012 | Bourne et al. |

(Continued)

FOREIGN PATENT DOCUMENTS

| | | |
|---|---|---|
| KR | 101636884 | 7/2016 |
| KR | 1020180058877 | 7/2018 |
| WO | 20160139666 A1 | 9/2016 |

OTHER PUBLICATIONS

Jan. 10, 2020 Office Action for corresponding U.S. Appl. No. 15/700,210.

(Continued)

*Primary Examiner* — Charles Guiliano
(74) *Attorney, Agent, or Firm* — Fish & Richardson P.C.

(57) ABSTRACT

Automated computing machinery that agnostically augments a customer relationship management ("CRM") application, including a leadership hub with computer memory configured according to a logical table, with logical columns identifying sales campaigns and a column identifying tele-agents, including also logical rows, each row representing an assignment of a tele-agent to work on a sales campaign; and a campaign management portal with computer memory configured according to a logical table, with logical columns identifying sales campaigns and a column identifying display templates, including also logical rows, each row associating a sales campaign and a display template comprising at least one sales campaign question and an answer form for the question; the leadership hub and the campaign management portal operative to display the template as an overlay of a web page of a CRM.

15 Claims, 6 Drawing Sheets

(56) References Cited

U.S. PATENT DOCUMENTS

| | | |
|---|---|---|
| 8,200,527 B1 | 6/2012 | Thompson et al. |
| 8,296,173 B2 | 10/2012 | Raffel et al. |
| 8,326,676 B2 | 12/2012 | Rose et al. |
| 8,332,279 B2 | 12/2012 | Woolston |
| 8,411,843 B1 | 4/2013 | Cyriac |
| 8,600,804 B2 | 12/2013 | Ramchandani et al. |
| 8,615,786 B1 | 12/2013 | Bryce et al. |
| 8,649,500 B1 | 2/2014 | Cohen et al. |
| 9,049,295 B1 | 6/2015 | Cooper |
| 9,092,802 B1 | 7/2015 | Akella |
| 9,165,556 B1 | 10/2015 | Sugar |
| 9,258,423 B1 | 2/2016 | Beall et al. |
| 9,390,399 B2 | 7/2016 | Parker, III et al. |
| 9,848,082 B1 | 12/2017 | Lilland |
| 9,860,391 B1 | 1/2018 | Wu et al. |
| 9,948,783 B1 | 4/2018 | Farrell |
| 9,998,596 B1 | 6/2018 | Dunmire et al. |
| 10,026,092 B2 | 7/2018 | Heater et al. |
| 10,027,803 B2 | 7/2018 | Krinsky et al. |
| 10,057,423 B1 | 8/2018 | Sheikh |
| 10,101,976 B2 | 10/2018 | Cavalcante |
| 10,303,466 B1 | 5/2019 | Karman |
| 10,438,595 B2 | 10/2019 | Kim et al. |
| 10,453,032 B1 | 10/2019 | Obeng et al. |
| 10,482,384 B1 | 11/2019 | Stoilos |
| 10,831,811 B2 | 11/2020 | Kraus et al. |
| 10,839,424 B1 | 11/2020 | Frankel |
| 2002/0059283 A1 | 5/2002 | Shapiro et al. |
| 2003/0126136 A1 | 7/2003 | Omoigui |
| 2004/0143473 A1 | 7/2004 | Tivey et al. |
| 2004/0210881 A1 | 10/2004 | Friedman |
| 2005/0002502 A1 | 1/2005 | Cloran |
| 2005/0005266 A1 | 1/2005 | Datig |
| 2005/0044357 A1 | 2/2005 | Fano |
| 2005/0091123 A1 | 4/2005 | Freishtat et al. |
| 2005/0105712 A1 | 5/2005 | Williams et al. |
| 2005/0125276 A1 | 6/2005 | Rusu |
| 2005/0177380 A1 | 8/2005 | Pritchard et al. |
| 2005/0278297 A1 | 12/2005 | Nelson |
| 2006/0095273 A1 | 5/2006 | Montvay et al. |
| 2006/0098625 A1 | 5/2006 | King |
| 2006/0239439 A1 | 10/2006 | Blackwood |
| 2006/0242626 A1 | 10/2006 | Pham et al. |
| 2006/0256953 A1 | 11/2006 | Pulaski et al. |
| 2007/0019618 A1 | 1/2007 | Shaffer |
| 2007/0064913 A1 | 3/2007 | Shaffer |
| 2007/0094183 A1 | 4/2007 | Paek et al. |
| 2007/0208858 A1* | 9/2007 | Ra .................. G06Q 10/06 709/227 |
| 2007/0233561 A1 | 10/2007 | Golec |
| 2008/0120129 A1 | 5/2008 | Seubert et al. |
| 2008/0162498 A1 | 7/2008 | Omoigui |
| 2008/0275744 A1 | 11/2008 | MacIntyre et al. |
| 2009/0070322 A1 | 3/2009 | Salvetti |
| 2009/0089131 A1 | 4/2009 | Moukas et al. |
| 2009/0132474 A1 | 5/2009 | Ma |
| 2009/0245500 A1 | 10/2009 | Wampler |
| 2009/0271192 A1 | 10/2009 | Marquette et al. |
| 2009/0300528 A1 | 12/2009 | Stambaugh |
| 2010/0010802 A1 | 1/2010 | Ruano |
| 2010/0036788 A1 | 2/2010 | Wu |
| 2010/0063799 A1 | 3/2010 | Jamieson |
| 2010/0070448 A1 | 3/2010 | Omoigui |
| 2010/0104087 A1 | 4/2010 | Byrd et al. |
| 2010/0114563 A1 | 5/2010 | Choi |
| 2010/0169888 A1 | 7/2010 | Hare et al. |
| 2011/0077999 A1 | 3/2011 | Becker et al. |
| 2011/0082829 A1 | 4/2011 | Kolovski |
| 2011/0113094 A1 | 5/2011 | Chunilal |
| 2011/0145278 A1 | 6/2011 | Maes |
| 2011/0179102 A1 | 7/2011 | Ravichandran et al. |
| 2011/0206198 A1 | 8/2011 | Freedman |
| 2011/0214050 A1 | 9/2011 | Stambaugh |
| 2011/0264451 A1 | 10/2011 | Hoepfinger |
| 2011/0289106 A1 | 11/2011 | Rankin, Jr. et al. |
| 2011/0314366 A1 | 12/2011 | Parker, III et al. |
| 2012/0059776 A1 | 3/2012 | Estes |
| 2012/0078636 A1 | 3/2012 | Ferrucci |
| 2012/0143881 A1 | 6/2012 | Baker et al. |
| 2012/0233558 A1 | 9/2012 | Naim |
| 2012/0275642 A1 | 11/2012 | Aller |
| 2012/0303355 A1 | 11/2012 | Liu et al. |
| 2013/0006916 A1 | 1/2013 | McBride et al. |
| 2013/0091090 A1 | 4/2013 | Spivack et al. |
| 2013/0144685 A1* | 6/2013 | Reynolds .......... G06Q 10/0637 705/7.32 |
| 2013/0151314 A1 | 6/2013 | Kugler et al. |
| 2013/0163731 A1 | 6/2013 | Van |
| 2013/0173798 A1 | 7/2013 | Micucci et al. |
| 2013/0204663 A1 | 8/2013 | Kahlow |
| 2013/0227431 A1 | 8/2013 | Vasudevan et al. |
| 2013/0262074 A1* | 10/2013 | Heidasch .......... G06F 16/2457 703/22 |
| 2013/0268357 A1 | 10/2013 | Heath |
| 2013/0282594 A1 | 10/2013 | Gaedcke et al. |
| 2013/0326048 A1 | 12/2013 | Heidasch |
| 2014/0022328 A1 | 1/2014 | Gechter et al. |
| 2014/0081585 A1 | 3/2014 | Cappucino et al. |
| 2014/0081714 A1* | 3/2014 | Debow ............ G06Q 10/06398 705/7.42 |
| 2014/0081934 A1 | 3/2014 | Mizell |
| 2014/0122535 A1 | 5/2014 | Gerard |
| 2014/0122993 A1 | 5/2014 | Calvin et al. |
| 2014/0164502 A1 | 6/2014 | Khodorenko |
| 2014/0189680 A1 | 7/2014 | Kripalani |
| 2014/0201234 A1 | 7/2014 | Lee et al. |
| 2014/0214530 A1 | 7/2014 | Duva et al. |
| 2014/0270108 A1 | 9/2014 | Riahi et al. |
| 2014/0278343 A1 | 9/2014 | Tran |
| 2014/0279059 A1 | 9/2014 | Margrett et al. |
| 2014/0314225 A1 | 10/2014 | Riahi |
| 2014/0372630 A1 | 12/2014 | Bostick |
| 2014/0379755 A1 | 12/2014 | Kuriakose |
| 2015/0012350 A1 | 1/2015 | Li et al. |
| 2015/0066479 A1 | 3/2015 | Pasupalak |
| 2015/0066580 A1 | 3/2015 | Bryant et al. |
| 2015/0142704 A1 | 5/2015 | London |
| 2015/0189085 A1 | 7/2015 | Riahi et al. |
| 2015/0201077 A1 | 7/2015 | Konig et al. |
| 2015/0213512 A1 | 7/2015 | Spievak et al. |
| 2015/0242410 A1 | 8/2015 | Pattabhiraman et al. |
| 2015/0254234 A1 | 9/2015 | Dixit et al. |
| 2015/0261743 A1 | 9/2015 | Sengupta |
| 2015/0294405 A1 | 10/2015 | Hanson |
| 2015/0309994 A1 | 10/2015 | Liu |
| 2015/0347951 A1 | 12/2015 | Tamblyn et al. |
| 2015/0348551 A1 | 12/2015 | Gruber |
| 2015/0379603 A1 | 12/2015 | Gupta |
| 2016/0006875 A1 | 1/2016 | Burmeister et al. |
| 2016/0019882 A1 | 1/2016 | Matula |
| 2016/0021181 A1 | 1/2016 | Ianakiev et al. |
| 2016/0034457 A1 | 2/2016 | Bradley |
| 2016/0036981 A1 | 2/2016 | Hollenberg |
| 2016/0036982 A1 | 2/2016 | Ristock |
| 2016/0036983 A1 | 2/2016 | Korolev |
| 2016/0103803 A1 | 4/2016 | Lam |
| 2016/0117593 A1 | 4/2016 | London |
| 2016/0142541 A1 | 5/2016 | Sharpe et al. |
| 2016/0162913 A1 | 6/2016 | Linden et al. |
| 2016/0171099 A1 | 6/2016 | Lorge et al. |
| 2016/0173693 A1* | 6/2016 | Spievak ............ H04M 3/42042 379/265.09 |
| 2016/0188686 A1 | 6/2016 | Hopkins |
| 2016/0189028 A1 | 6/2016 | Hu et al. |
| 2016/0217479 A1 | 7/2016 | Kashyap et al. |
| 2016/0239851 A1 | 8/2016 | Tanner |
| 2016/0162474 A1 | 9/2016 | Agarwal |
| 2016/0308999 A1 | 10/2016 | Bonmassar et al. |
| 2016/0321748 A1 | 11/2016 | Mahatm |
| 2016/0335544 A1 | 11/2016 | Bretschneider et al. |
| 2016/0371724 A1 | 12/2016 | Kulpa et al. |
| 2016/0378328 A1 | 12/2016 | Abrahams et al. |
| 2017/0006135 A1 | 1/2017 | Siebel et al. |
| 2017/0017517 A1 | 1/2017 | Kandappan et al. |

(56) References Cited

U.S. PATENT DOCUMENTS

| | | |
|---|---|---|
| 2017/0017694 A1 | 1/2017 | Roytman et al. |
| 2017/0024375 A1 | 1/2017 | Hakkani-Tur |
| 2017/0076295 A1 | 3/2017 | Vasudev et al. |
| 2017/0091390 A1 | 3/2017 | Joul |
| 2017/0124193 A1 | 5/2017 | Li |
| 2017/0147635 A1 | 5/2017 | Mcateer et al. |
| 2017/0154108 A1 | 6/2017 | Li et al. |
| 2017/0177715 A1 | 6/2017 | Chang |
| 2017/0200220 A1 | 7/2017 | Nicholson |
| 2017/0195488 A1 | 8/2017 | Pendyaia |
| 2017/0262429 A1 | 9/2017 | Harper |
| 2017/0262530 A1 | 9/2017 | Okura |
| 2017/0264575 A1 | 9/2017 | Willshire |
| 2017/0293610 A1 | 10/2017 | Tran |
| 2017/0315683 A1 | 11/2017 | Boucher et al. |
| 2017/0329466 A1 | 11/2017 | Krenkler et al. |
| 2018/0052861 A1 | 2/2018 | Seetharaman et al. |
| 2018/0082183 A1 | 3/2018 | Hertz et al. |
| 2018/0115644 A1 | 4/2018 | Al-Khaja |
| 2018/0144250 A1 | 5/2018 | Kwon |
| 2018/0150459 A1 | 5/2018 | Farid |
| 2018/0157685 A1 | 6/2018 | Flerl et al. |
| 2018/0189349 A1 | 7/2018 | Sirohi et al. |
| 2018/0219849 A1 | 8/2018 | Jones et al. |
| 2018/0288098 A1 | 10/2018 | Wang |
| 2018/0300310 A1 | 10/2018 | Shinn |
| 2018/0315000 A1 | 11/2018 | Kulkarni |
| 2018/0315001 A1 | 11/2018 | Garner |
| 2018/0338040 A1 | 11/2018 | Carly |
| 2018/0365772 A1 | 12/2018 | Thompson |
| 2018/0376002 A1 | 12/2018 | Abraham |
| 2019/0042988 A1 | 2/2019 | Brown |
| 2019/0080370 A1 | 3/2019 | Copeland |
| 2019/0121856 A1 | 4/2019 | Terry et al. |
| 2019/0158309 A1 | 5/2019 | Park et al. |
| 2019/0188617 A1 | 6/2019 | Copeland |
| 2019/0206400 A1 | 7/2019 | Cui |
| 2019/0220794 A1 | 7/2019 | Kulkarni |
| 2019/0312869 A1 | 10/2019 | Han et al. |
| 2019/0340294 A1 | 11/2019 | Spangler |
| 2019/0340622 A1 | 11/2019 | Azoulay et al. |
| 2019/0347668 A1 | 11/2019 | Williams et al. |
| 2019/0391825 A1 | 12/2019 | Jann et al. |
| 2019/0394332 A1 | 12/2019 | Dunmire et al. |
| 2020/0007530 A1 | 1/2020 | Mohamad Abdul et al. |
| 2020/0042642 A1 | 2/2020 | Bakis |
| 2020/0057946 A1 | 2/2020 | Singaraju et al. |
| 2020/0097814 A1 | 3/2020 | Devesa |
| 2020/0110835 A1 | 4/2020 | Zhao |
| 2020/0111485 A1 | 4/2020 | Copeland |
| 2020/0175545 A1 | 6/2020 | Handrigan et al. |
| 2020/0184278 A1 | 6/2020 | Zadeh et al. |
| 2020/0226156 A1 | 7/2020 | Borra et al. |
| 2020/0374395 A1 | 11/2020 | Tsao et al. |
| 2021/0334756 A1 | 10/2021 | Copeland |
| 2021/0334815 A1 | 10/2021 | Copeland |
| 2021/0334816 A1 | 10/2021 | Copeland |

OTHER PUBLICATIONS

Jan. 25, 2020 Office Action for corresponding U.S. Appl. No. 15/844,512.

Jul. 25, 2019 Office Action for corresponding U.S. Appl. No. 16/198,742.

Final Office Action dated Jul. 27, 2020 for corresponding U.S. Appl. No. 15/844,512.

Final Office Action dated Jul. 30, 2020 for corresponding U.S. Appl. No. 16/154,718.

Final Office Action dated Jul. 7, 2020 for corresponding U.S. Appl. No. 15/700,210.

Mar. 5, 2020 Office Action for corresponding U.S. Appl. No. 16/183,736.

May 4, 2020 Office Action for corresponding U.S. Appl. No. 16/154,718.

Non-Final Office Action dated Sep. 29, 2020 for corresponding U.S. Appl. No. 16/157,075.

Non-Final Office Action dated Sep. 30, 2020 for corresponding U.S. Appl. No. 16/911,717.

Oct. 19, 2020 Notice of Allowance for corresponding U.S. Appl. No. 16/157,075.

Liew "Strategic integration of knowledge management and customer relationship 1-20 management." In: Journal of Knowledge Management. Jul. 18, 2008 (Jul. 18, 2008) Retrieved on Dec. 25, 2019 (Dec. 25, 2019) from <http://student.bms.lk/GDM/49/Slides/MarManaSampleAssi/MMAsuportingJouArti/13673270810884309.pdf> entire document.

Tung. "Google's human-sounding AI to answer calls at contact centers." In: ZDNet. Jul. 25, 2018 (Jul. 25, 2018) Retrieved on Dec. 25, 2019 (Dec. 25, 2019) from <https://www.zdnet.com/article/googles-human-sounding-ai-to-answer-calls-at-contact-centers/> entire document.

International Search Report and Written Opinion dated Jan. 9, 2020 for PCT/US2019/055488.

International Search Report and Written Opinion dated Jan. 14, 2020 for PCT/US2019/060174.

International Search Report and Written Opinion dated Jan. 17, 2020 for PCT/US2019/058997.

International Search Report and Written Opinion dated Feb. 22, 2019 for PCT/US2018/065584.

International Search Report and Written Opinion dated Mar. 9, 2020 for PCT/US2019/059949.

International Search Report and Written Opinion dated Apr. 1, 2020 for PCT/US2019/055483.

International Search Report and Written Opinion dated Nov. 28, 2018 for PCT/US2018/049813.

International Search Report and Written Opinion dated Dec. 30, 2019 for PCT/US2019/062629.

Manochar Chapalamadugu, New Agile CRM Chrome Extension, Published Jul. 21, 2014, agilecrm.com, pp. 1-3 (pdf).

PCT International Search Report and Written Opinion in International Appln. No. PCT/US2021/070096, dated Jun. 10, 2021, 6 pages.

Yawer Iqbal, Browser extensions for Dynamics CRM, Published Feb. 1, 2018, Iqbal, pp. 1-13 (pdf).

* cited by examiner

AGNOSTIC AUGMENTATION OF A CUSTOMER RELATIONSHIP MANAGEMENT APPLICATION

The following U.S. patent applications, related by subject matter to this application, are hereby for all purposes incorporated by reference into this application as though fully set forth herein:

U.S. patent application Ser. No. 15/700,210; filed Sep. 11, 2017, entitled Dynamic Scripts for Tele-Agents U.S. patent application Ser. No. 15/844,512; filed Dec. 15, 2017, entitled Dynamic Lead Generation;

U.S. patent application Ser. No. 16/157,075; filed Oct. 10, 2018, entitled Semantic Jargon;

U.S. patent application Ser. No. 16/154,718 filed Oct. 9, 2018, entitled Semantic Call Notes U.S. patent application Ser. No. 16/177,423 filed Oct. 31, 2018, entitled Semantic Inferencing in Customer Relationship Management U.S. patent application Ser. No. 16/183,725, filed Nov. 7, 2018, entitled Semantic CRM Mobile Communications Sessions U.S. patent application Ser. No. 16/183,736, filed Nov. 8, 2018, entitled Semantic Artificial Intelligence Agent; and U.S. patent application Ser. No. 16/198,742 filed Nov. 21, 2018, entitled Semantic CRM Transcripts from Mobile Communications Sessions

BACKGROUND

Customer Relationship Management ('CRM') is an approach to managing a company's interaction with current and potential customers. CRM implements data analysis of customers' history with a company to improve business relationships with customers, specifically focusing on customer retention and sales growth. CRM systems compile data from a range of communication channels, including telephone, email, live chat, text messaging, marketing materials, websites, and social media. Through the CRM approach and the systems used to facilitate it, businesses learn more about their target audiences and how to best address their needs.

Enterprise CRM systems typically are huge. Such systems can include data warehouse technology, used to aggregate transaction information, to merge the information with information regarding CRM products and services, and to provide key performance indicators. CRM systems aid managing volatile growth and demand and implement forecasting models that integrate sales history with sales projections. CRM systems track and measure marketing campaigns over multiple networks, tracking customer analysis by customer clicks and sales.

In view of their sheer size, CRM systems today tend to lack the infrastructure to make full use of the information they can access. A single tele-agent, working in a contact center supporting a hundred agents, is tasked to operate across several, or even many, client CRM systems, each having different interfaces. The need to learn many interfaces increases risk of error. The need to learn many interfaces is an inefficient use of agent time. The need to operate across many interfaces slows the agent's workflow, an additional inefficiency.

DETAILED DESCRIPTION OF EXAMPLE EMBODIMENTS

Figure 1:
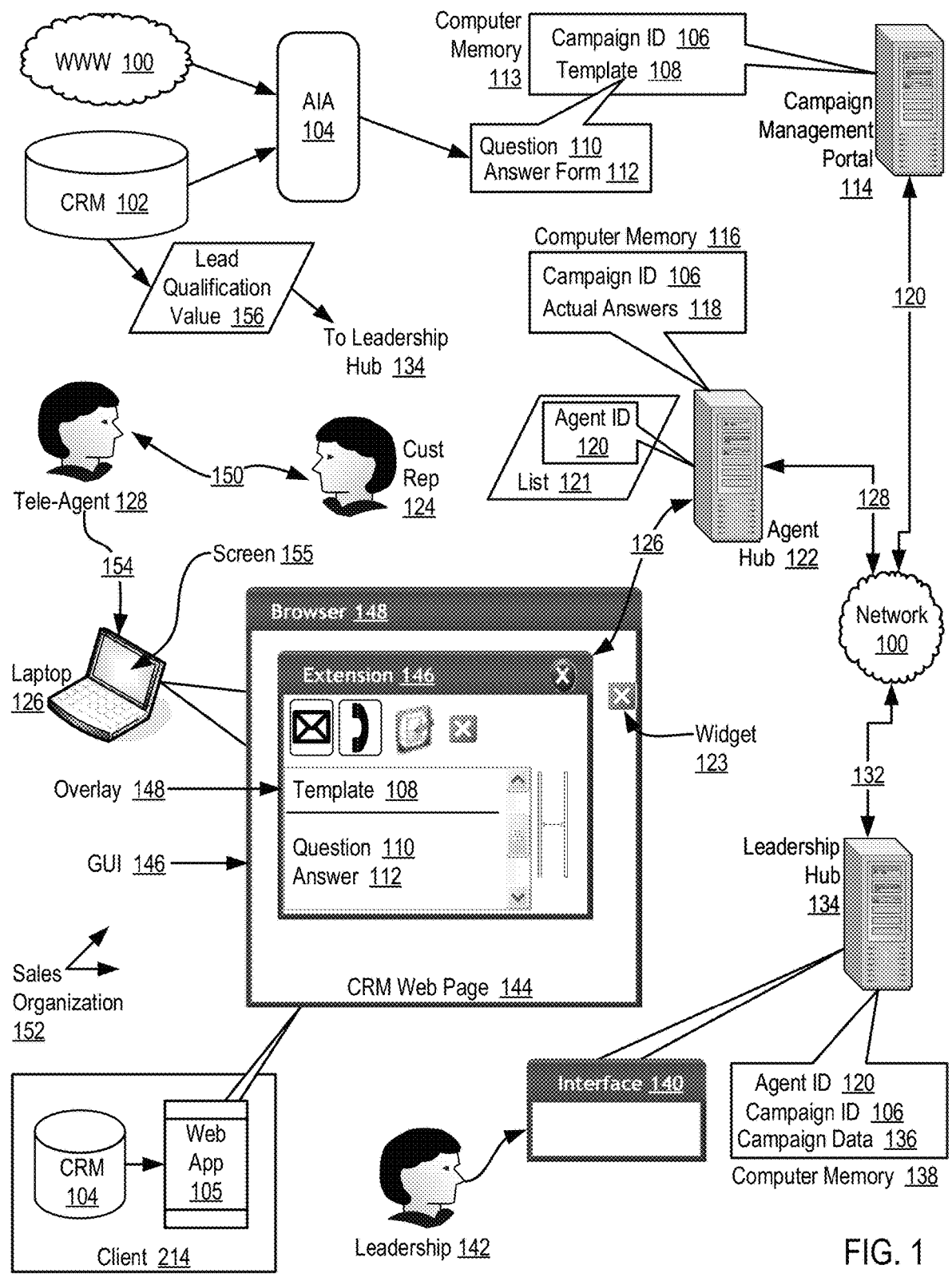
FIG. 1 sets forth a network diagram illustrating an example system of automated computing machinery that agnostically augments a customer relationship management ("CRM") application according to embodiments of the present invention.

Example methods and apparatus of automated computing machinery that agnostically augments a customer relationship management ("CRM") application are described with reference to the accompanying drawings, beginning with FIG. 1. FIG. 1 sets forth a network diagram illustrating an example system of automated computing machinery that agnostically augments a customer relationship management ("CRM") application according to embodiments of the present invention. 'Automated computing machinery' is any device built with a computer processor connected to computer memory that contains program instructions that operate the processor and data for the processor to process. Automated computing machinery includes computers, of course, such as, for example, laptop (126). In this example also, the campaign management portal (114), the agent hub (122), and leadership hub (134) are server-type computers each of which is built upon computer processors coupled to computer memory. Network (100) is also automated computing machinery, composed of one or more routers each of which is built with one or more computer processors controlled by computer instructions disposed in computer memory. Client CRM system (104) and sales organization CRM system (102) are also composed of automated computing machinery.

Three broad categories of entity are represented in the example of FIG. 1, a sales client (214), a sales customer (124), and a sales organization (152). The client (214) hires the sales organization (152) to administer a sales campaign to sell products or services to customers. Customers generally are represented here by a customer representative (124). The term 'customer' is used here to include not only customer actually purchasing, but also contacts, leads, prospects, and the like.

A tele-agent (128), sometimes referred to in this paper simply as an 'agent,' communicates (150) with the customer representative (125). The communication (150) is by telephone, email, text message, meetings in person, or otherwise, and so on. The agent (128) is hired as an employee or consultant by the sales organization to work as a salesperson on a sales campaign for the client. The term 'tele-agent' or merely 'agent' is used in this paper to indicate several possible roles, including for example, business development representative, inside sales rep, inbound sales rep, sales development rep, lead development rep, lead response rep, marketing qualification rep, market response rep, account development rep, account executive, sales executive, and so on, and so on, with all such called here 'tele-agent' or 'agent.'

The sales organization (152) operates as a call center or contact center that has been hired by a client to conduct sales campaign for client products or services. The sales organization itself can be a sales or marketing department in a larger organization, so that it's clients are other departments within the same overall company. The sales organization also is frequently an independent contractor or consultant having only a contractual relationship with the client. The sales organization in this example includes all the elements of FIG. 1 except the client (214), the client CRM system (104), and the customer representative (124).

The automated computing machinery in the example of FIG. 1 operates generally to agnostically augment a customer relationship management ("CRM") application (104) first by accepting a logon from a tele-agent (128). The tele-agent operates a browser (148) on a laptop (126). The browser operates a browser extension (146) obtained from an agent hub (122). A browser extension is a software module, typically source code, installed in the browser, customizing the browser, providing a user interface modified to display a sales template for a sales campaign and present the same interface for the template even across navigation of the browser among web pages. The browser is free to navigate pages of a web application, for example, while the interface exposed by the browser extension remains exactly the same. The extension can be thought of as a modified browser screen that remains stable even as the browser navigates among many other web pages, changing its display for each web page, always maintaining the same display from the extension.

The tele-agent logs on through the browser extension to the system organized on network (100) to include the agent hub (122), the campaign management portal (114), and the leadership hub (134). The agent hub maintains a list (121) of agent IDs (120) for agents who have logged onto the system. With the tele-agent logged in, the agent hub retrieves from the leadership hub (134) the campaigns to which the agent is assigned for work. The agent hub provides the agent ID to the leadership hub which looks up associated campaign IDs (106) in computer memory. If the agent is assigned to more than one campaign, the agent hub allows the agent to select one to work on. The agent hub then provides the campaign ID to the campaign management portal, which retrieves a sales template (108) in dependence upon the campaign ID. The agent hub then installs the template in the browser extension (146), and the agent uses the questions and answer forms in the template to discuss sales with a customer representative (124).

In the example of FIG. 1, the client's CRM (104) exposes its contents to the sales organization through a web application (104). A web application, or web app, is an application program that is stored on a remote server and delivered over the internet through a browser. The web app is a client-server computer program that the client, including the user interface and client-side logic, runs in a web browser. Such web apps in some embodiments are composed of one or more dynamic web pages having functionality similar to a desktop software application, or to a mobile app. Web apps can be loaded as web pages, but can accept input and store data locally. Web apps can be composed of multiple web pages operating in coordination or can operate as a single page against a single URL.

In the example of FIG. 1, the browser (148) is navigated to a web page (144) of the web app (105). The template (108) exposed through the browser extension (146) as an overlay (148) on the GUI (146) of the laptop (126) maintains exactly the same form and content throughout a campaign across all web pages (144) of the web app (105) of the client's CRM (214). This alleviates the burden on the tele-agent to disembed pertinent information from the client's CRM. The content of the template will change when the agent directs attention to a campaign of a different client, but the overall form of the template and the overall structure of its content questions and answer forms again will remain constant across all the web pages of the web app of the new client and the new client's campaign, thus also reducing the burden on the agent to know the details of two or more client CRMs.

The questions (110) in the template (108) are suggestions, keyed to a campaign (106), for the tele-agent to use in communicating with a customer representative. Examples include:

"I see from your recent announcements that you are beginning production of road graders in addition to your usual lines of front end loaders. We have in the past provided motors for your loaders, and we think we have new production that will fit your graders. Can I send you some literature?"
  "I see from your recent announcements that, in addition to your usual inventory control products, you are branching out into general ledgers. We have a current generation accounting engine specifically designed as a generic engine for posting outlying accounts into any general ledger. Can I send you some literature?"
  "I see from your recent ads that you are beginning production of switching power supplies in addition to your usual line of linear products. Our engineers recently designed and we now produce smoothing filters oriented specifically to the high-frequency noise components output from the switching process. Can I send you some literature?"

The answer forms (112) in the template (108) are forms or widgets without content, radio buttons, drop-down menus, data entry fields, and the like. Actual answers (118) are composed of pressed radio buttons, selections from drop-down menus, text entered in data entry fields, and so on. To the extent that actual answers to questions flow from communications (150) with the customer rep (124), the actual answers (118) are stored in association with the pertinent campaign ID (106) in computer memory (116) of the agent hub (122).

The questions (110) and answer forms (112) in the template (108) can be created as data entry by someone with knowledge of the products to which a campaign is directed or knowledge of the industry in which a sales campaign is disposed. In the example of FIG. 1, however, the questions and answer forms in the template are data mined by an artificial intelligence agent (104) from information found in the world wide web (100) and in the sales organization's own customer relationship management system (102).

As described in more detail below with regard to the example process illustrated in FIG. 5, the leadership hub in embodiments can create and populate data structures in computer memory (138) of a new campaign (106), including IDs of agents assigned to the campaign as well as additional campaign data such as products, client, duration, scope, and so on. The leadership hub can create a new campaign based upon a lead qualification value (156) provide by a CRM (102) internal to the sale organization. In addition to sourcing new campaigns and new campaign data from internal automation, in embodiments as in this example, a leadership hub can expose an interface (140) and accept input through the interface to create or edit campaigns among computer memory of the hub. In this example, campaign configuration is accepted through an interface (140) from campaign leadership (142). Campaign configuration from leadership (142)

by data entry through interface (140) enters computer memory (138) of the leadership hub (134) with a campaign ID (106), an agent ID for at least one agent assigned to work on the campaign, and additional descriptive campaign data (136). Leadership (142) in this example is any employee or consultant of the sales organization (152) with knowledge of the campaign and data entry authority on the leadership hub, including, for example, a sales team leader, a unit supervisor, a department manager, a sales executive, or the like. Additional campaign data (136) includes, for example, a campaign name, identity of a client for whom the campaign is implemented, roles of persons assigned to work on the campaign, duration of the campaign, geographic scope of the campaign, and products for sale in the campaign.

The leadership hub (134) and the campaign management portal (114) are operative to display the template (108) as an overlay (148) of a web page (144) of a CRM (104). An overlay as the term is used here refers to a GUI window operated by the browser under control of an extension that is displayed within the browser's on top of everything else in the browser's window. The extension provides a GUI widget (123) that can be invoked through the GUI to display the overlay or remove the overlay from the display. Displaying the overlay at least partly obscures the display of items overlaid. Removing the overlay restores full display of the underlying items in the browser window. While the overlay is displayed, it implements full functionality as a GUI window for display of template data and acceptance of input data through the interface. The display of the overlay is based upon the agent's ID (120). The leadership hub identifies, to the campaign management portal through the agent hub, a campaign ID (106) of a campaign to which the agent is assigned, and the campaign management hub provides to the agent hub for display a sales template (108) bearing questions (110) and answers (112) for a sales campaign. The sales template is then displayed in an overlay (148).

The example machinery of FIG. 1 includes a display screen (155) upon which is displayed a graphical user interface ("GUI") (146), and a pertinent web page (144) is displayed through the GUI, with the template (108) displayed as a GUI overlay (148) upon the web page. The web page (144) is a page in a web application (105) that exposes contents of a CRM (104) to the sales organization (152) including tele-agent (128).

In the example of FIG. 1, the template (108) is displayed as an overlay (108) in the same form across any web page of any CRM implemented as a web application or whose contents are exposed through a web app. The agent can, for example, navigate through a browser web pages of a web app of a client for a sales campaign and have available at all times on any web page the same form a template with questions and answers appropriate for that sales campaign. The template is functional in this way for any CRM implemented as a web application regardless of the structure or function of the CRM. In the example of FIG. 1, neither the hub (134) nor the portal (114) have any information, knowledge, nor any data regarding the structure or function of the CRM (104). In the example of FIG. 1, the machinery implements an interface neither between the CRM (104) and the hub (134) nor between the CRM (104) and the portal (114).

In view of this explanation, it can now be seen that 'agnostically' means that the computing machinery in the example of FIG. 1 operates for disparate CRMs exposed through web apps regardless of the structure or function of a particular CRM, with no knowledge of the structure or function of the CRM, and with no interface to the CRM. The machinery of FIG. 1 includes large quantities of memory, campaign management portal memory (113), leadership hub memory (138), the agent hub maintains agent information (120, 121) in computer memory, and so on. All this memory includes not one byte or bit describing the client's CRM (104). In the machinery of FIG. 1, the CRM (104) is exposed through a web app (105) on a normal browser screen (148) to an agent using the browser. The machinery of FIG. 1 uses the browser to implement a browser extension (146) that in turn implements an overlay (148) that displays a template (108) of the system. Nevertheless, there is no interface or connection or communications or sharing of data between the client CRM (104) and the computing machinery of the sales organization. With respect to the CRM (104), the machinery of FIG. 1 knows nothing. The machinery of FIG. 1 is agnostic with respect to the client's CRM (104).

Computer memory (113, 116, 138) in the example of FIG. 1, and in subsequent drawings also, is depicted as entities of example computer hardware, computers or servers (114, 122, 134). Readers will recognize, however, that this depiction is only for ease of explanation, not for limitation. Computer memory according to embodiments can be implemented in multiple computers or servers, hundreds of disk drives in a data center, high speed disk networks, cloud storage, and so, and so on.

Figure 2:
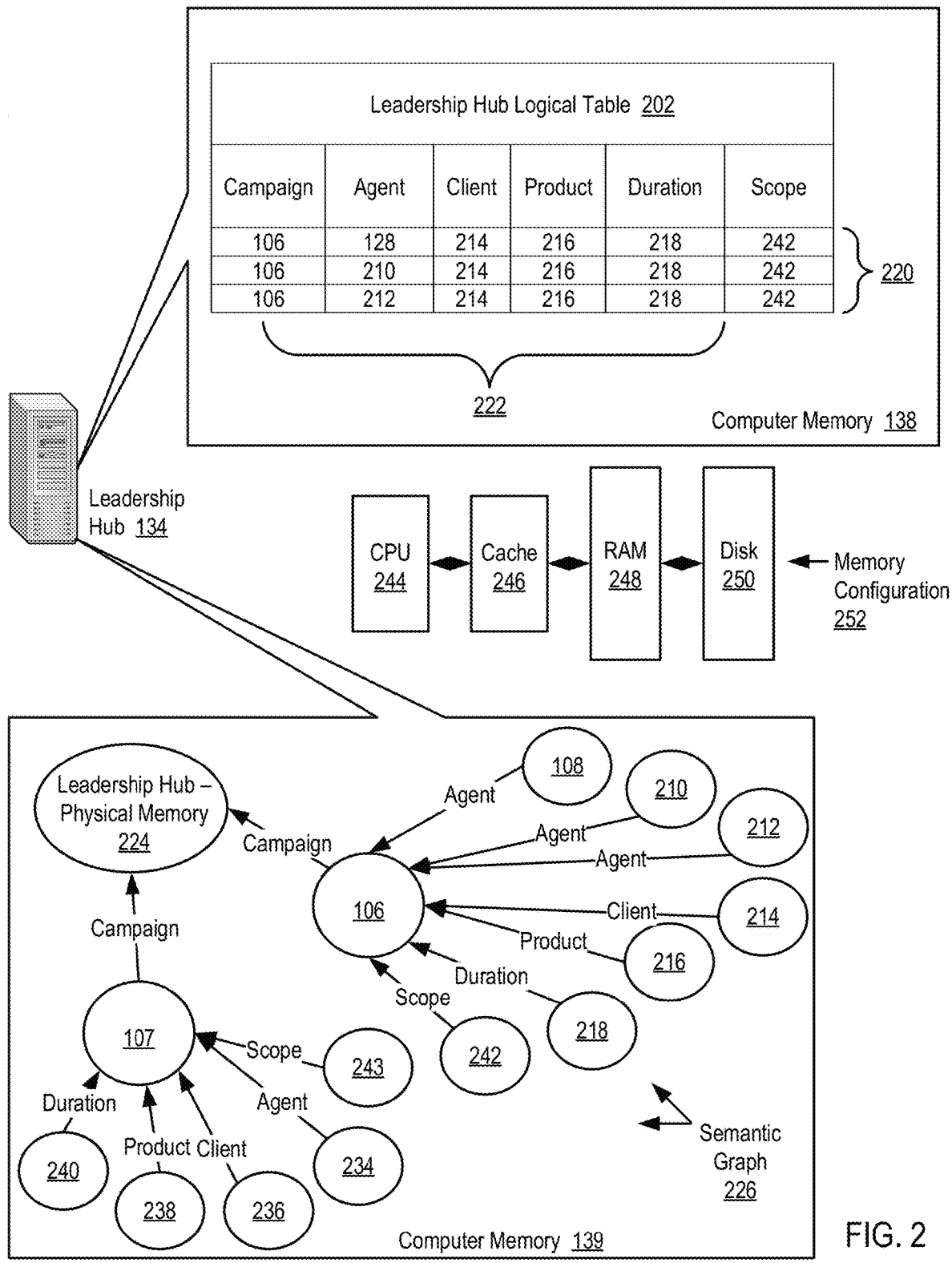
FIG. 2 illustrates computer memory of a leadership hub configured according to embodiments of the present invention.

For further explanation, FIG. 2 illustrates computer memory (138, 139) of a leadership hub (134) configured according to embodiments of the present invention. The leadership hub (134) in the example of FIG. 2 is a module of the automated computing machinery, that is a computer or server operated by at least one computer processor coupled for data communications to computer memory. In the example of FIG. 2, the computer memory (138) is configured according to a logical table (202) The table includes a number of logical columns (222) including a column identifying sales campaigns (106) and a column identifying tele-agents (128, 210, 212). The table also includes logical rows (220), each row representing an assignment of a tele-agent to work on a sales campaign. In addition to the columns for campaign and agent, the table includes also columns identifying a client (214), products (216) subject of a sales campaign, a duration of a campaign (218), and geophysical scope of a campaign (242).

The rows (220) in the example of FIG. 2 serve to associated agents with a campaign. Storing client, product, duration, and scope with each association of an agent and a campaign represents some redundancy of storage. Readers will recognize that the redundancy can be reduced by placing the agent IDs in a separate sub-table accessed by use of the campaign ID as a foreign key. Tables associated by foreign keys, one-to-many relations, many-to-one relations, and so on, are all included within the meaning of 'logical table' as the term is used in this paper.

In addition to the logical table (202), FIG. 2 also sets forth an example of memory physically configured as a semantic graph (226) in the computer memory (139) of the leadership hub (134). A semantic graph is a configuration of memory that uses graph structures, nodes and edges, to represent and store data. A key concept of this kind of configuration is the graph (or edge or relationship), which directly relates data items in a data store. Such a graph database contrasts with more conventional storage such as a logical table, where links among data are mere indirect metadata, and queries search for data within the store using joins to collect related data. Semantic graphs, by design, make explicit relations among data that can be difficult to model in relational systems or logical tables.

The semantic graph (226) in the example of FIG. 2 illustrates a physical arrangement of campaign (106) and an additional campaign also, (107). The semantic graph of campaign (106), just as was effected by the logical table (202), also associates tele-agents (108, 210, 220) with the campaign (106). In addition, in the semantic graph of campaign (106), data describing the client (214), product (216), duration (218), and physical scope (242) each are stored only once, thus reducing the inefficient redundancy evidenced in the logical table (202). In some embodiments, a logical table is easier to comprehend and manipulate. In a logical table, however, the identification of data elements, campaign, agent, client, product, and so on, is metadata, typically required to be known to a programmer before accessing the data. In the semantic graph, the semantic definition of each data element (108, 214, 216, and so on) is built into the graph edge that associates the data element with the campaign, "agent," "client,", "product," and so on. So in the semantic graph, the meta-data explaining the data content is itself an element of the content.

For further explanation, notice that the arrangement of nodes and edges in the semantic graph of FIG. 2 can be characterized as semantic triples. A semantic triple is a three-part statement expressed in a form of logic. Depending on context, different terminologies are used to refer to effectively the same three parts of a statement in a logic. In this paper, the elements of a triple are referred to as subject, predicate, and object. Thus, the semantic triple that includes the node campaign (106) connected by the edge labeled "Agent" to node (108) is expressed as a semantic triple as:

| | |
|---|---|
| subject: | campaign (106) |
| predicate: | has an assigned agent |
| object: | agent (108) |

The association of the campaign (106) and the client for the campaign can be expressed as the semantic triple:

| | |
|---|---|
| subject: | campaign (106) |
| predicate: | is for a client |
| object: | client (214) |

The association of the campaign (106) and a product that is a subject of the campaign can be expressed as the semantic triple:

| | |
|---|---|
| subject: | campaign (106) |
| predicate: | sells a product |
| object: | product (216) |

And so on, for all the data relations in semantic graph (226).

The identifications of sales campaigns and tele-agents in the leadership hub, as well as other information in the computer memory of the leadership hub, are, in some embodiments at least, physically configured as semantic triples in contiguous segments of the computer memory of the leadership hub. 'Contiguous' means storage of the data content of semantic triples adjacent to one another sequentially in physical memory. Contiguous memory is explained in more detail with reference to the physical memory configuration (252) of FIG. 2. Memory configuration (252) sets forth a block diagram of a computer memory system, configured supportive of physical memory according to embodiments, that includes a computer processor ("CPU") (244) coupled for data communications to cache memory (246), random access memory ("RAM") (248), and disk memory (250). In accessing physical memory, the CPU looks first in the cache. Upon a cache miss, the CPU seeks memory content in RAM (248) and moves it into the cache. Failing to find sought content in RAM, a failure termed a "page fault," the CPU looks all the way out to the disk (250), moves content into RAM (248) and then into cache (246).

For a pertinent set of triples, a subgraph, for example, previously stored, composed of 10 kilobytes of storage, some computer systems today support memory page sizes of a megabyte or more. Such a set of triples can be stored in a single memory page, and, once that page is in RAM, operation of the triple set for CRM can proceed with no risk of page faults at all. Cache misses would still be required to load the contents into cache, but, with the entire triple set in RAM, the cache misses would not risk page faults. The inventors estimate that after a short period of operation, the cache miss rate would be less than one percent for operation of such a set of triples in the context of CRM. That is, when a set of triples is disposed in contiguous memory in support of CRM according to embodiments of the present invention, memory access times generally will approximate cache access times, just a few nanoseconds, for more than 99% of memory access.

Figure 3:
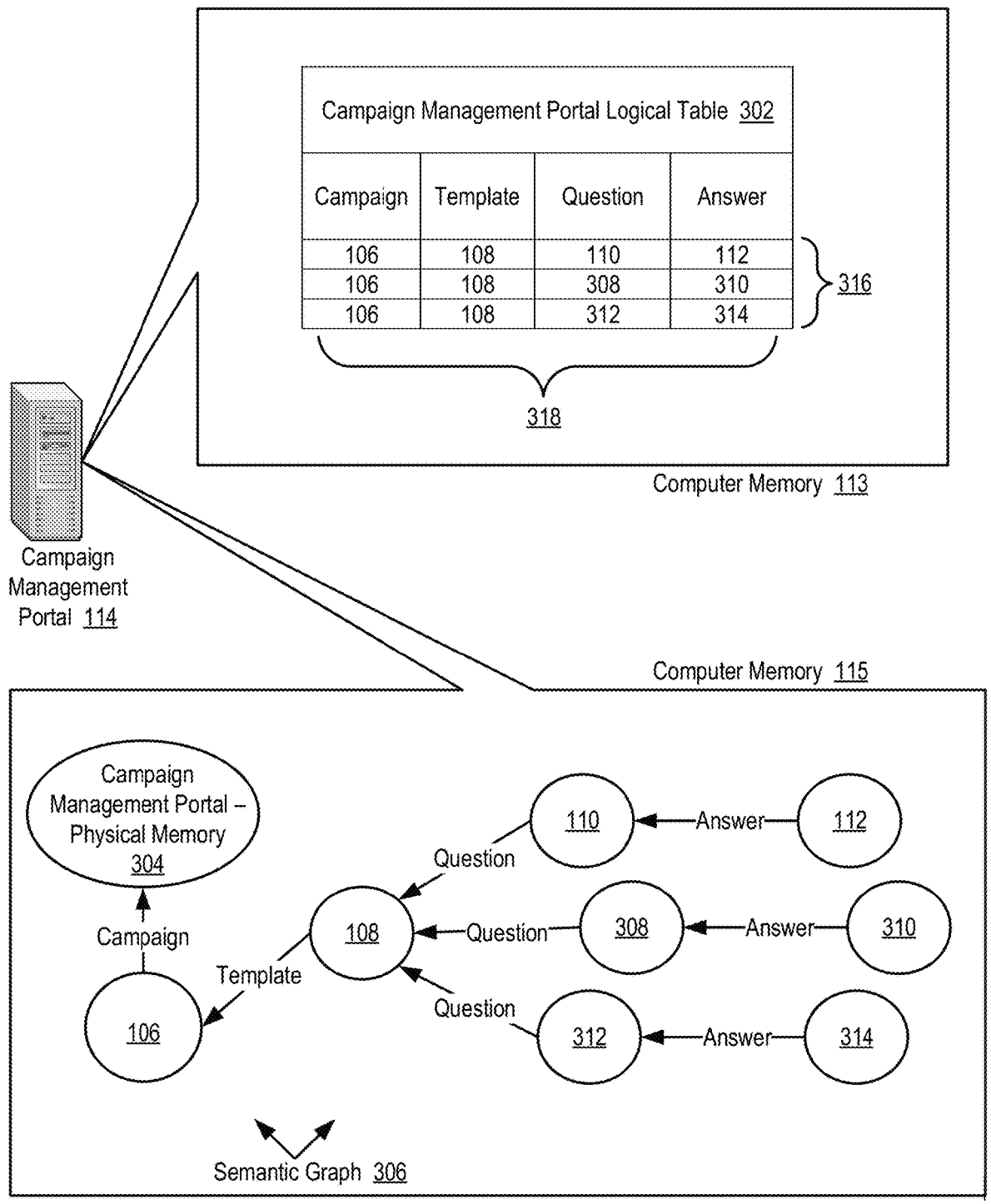
FIG. 3 illustrates computer memory of a campaign management portal configured according to embodiments of the present invention.

For further explanation, FIG. 3 illustrates computer memory (113, 115) of a campaign management portal (114) configured according to embodiments of the present invention.

The campaign management portal (114) in the example of FIG. 3 is a module of the automated computing machinery, that is a computer or server operated by at least one computer processor coupled for data communications to computer memory. In the example of FIG. 3, the computer memory (113) is configured according to a logical table (302). The table includes a number of logical columns (318) including a column identifying sales campaigns (106) and a column identifying display templates (108).

The table also includes logical rows (316). Each row in this example associates a sales campaign (106) and a display template (108) that also associates at least one sales campaign question (110, 308, 312) and an answer form (112, 310, 314) for the question. The answer forms (112, 310, 314) associated with template (108) are forms without content, radio buttons, drop-down menus, data entry fields, and the like. Actual answers are composed of pressed radio buttons, selections from drop-down menus, text entered in data entry fields, and so on. Actual answers are stored in association with the pertinent campaign ID (106) in computer memory of an agent hub (118 on FIG. 1).

In addition to the logical table (302), FIG. 3 also sets forth an example of memory physically configured as a semantic graph (306) in the computer memory (115) of the campaign management portal (114). The semantic graph (306) in the example of FIG. 3 illustrates a physical arrangement of memory for a campaign (106), an associated template (108), associated questions (110, 308, 312), and associated answer forms (112, 310, 314). In the semantic graph (306) associating questions and answer forms with a template of a campaign, the campaign data (106) and the template data (108) are stored only once, thus reducing the redundancy evidenced in the logical table (302) where campaign data (106) and template data are stored three time, once for each combination of question and answer form.

The arrangement of nodes and edges in the semantic graph of FIG. 3 can be characterized as semantic triples, where, for example, the triple that includes the campaign (106) and the template (108) can be expressed as:

| subject: | campaign (106) |
|---|---|
| predicate: | has a template |
| object: | template (108) |

The association of the template (108) and the first question can be expressed as:

| subject: | template (108) |
|---|---|
| predicate: | has a question |
| object: | question (110) |

The association of the question (110) and answer form (112) can be expressed as the semantic triple:

| subject: | question (110) |
|---|---|
| predicate: | has an answer form |
| object: | answer form (112) |

And so on, for all the data relations in semantic graph (306).

The identifications of sales campaigns (106) and display templates (108), including sales campaign questions (110, 308, 312) and answer forms (112, 310, 314), are, in some embodiments at least, physically configured as semantic triples in contiguous segments of the computer memory of the campaign management portal. Contiguous memory is explained in more detail above in this paper with reference to the physical memory configuration (252) of FIG. 2.

Figure 4:
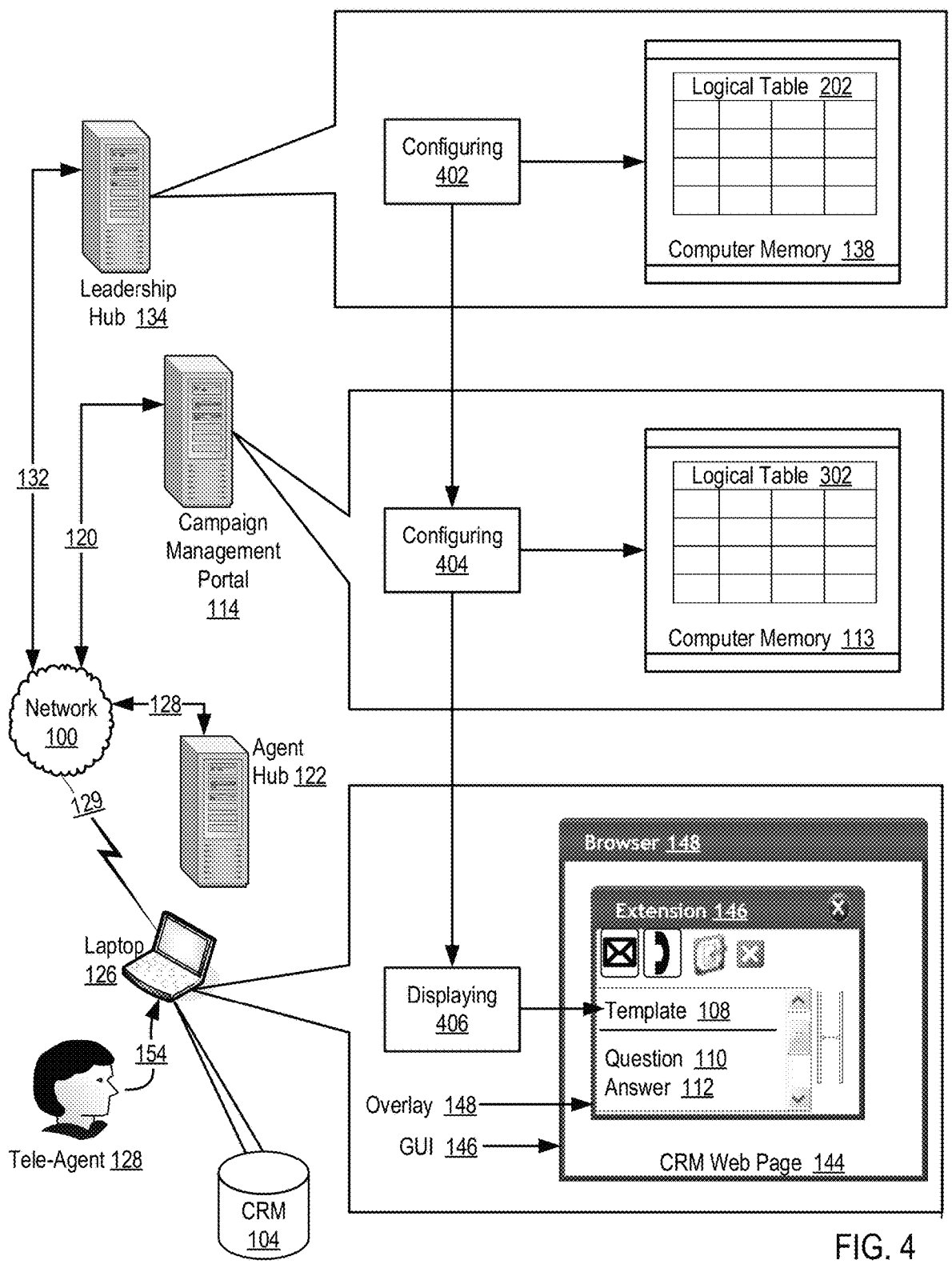
FIGS. 4-6 set forth flow charts illustrating example methods of agnostically augmenting a customer relationship management ("CRM") application according to embodiments of the present invention.

For further explanation, FIG. 4 sets forth a flow chart illustrating an example method of agnostically augmenting a customer relationship management ("CRM") application according to embodiments of the present invention. 'Agnostically' means that the method of FIG. 4 operates for disparate CRMs exposed through web apps regardless of the structure or function of a particular CRM, with no knowledge of the structure or function of the CRM, and with no interface to the CRM. In the method of FIG. 4, the CRM (104) is exposed on a normal browser screen (148) to an agent using the browser. The method of FIG. 4 uses the browser to implement a browser extension (146) that in turn implements an overlay (148) that displays a template (108) of the method. Nevertheless, there is no interface or connection or communications or sharing of data or information between the CRM and the method of FIG. 4. With respect to the CRM, the method of FIG. 4 knows nothing. The method of FIG. 4 is agnostic with respect to the CRM (104).

The method of FIG. 4 includes configuring (402) by a leadership hub (134) computer memory (138) of the hub according to a logical table (202). The contents of the table (202), illustrated on FIG. 2, include a number of logical columns (222) including a column identifying sales campaigns (106) and a column identifying tele-agents (128, 210, 212). The table also includes logical rows (220), each row representing an assignment of a tele-agent to work on a sales campaign.

The method of FIG. 4 also includes configuring (404) by a campaign management portal (114) computer memory (113) of the portal according to a logical table (302). The table is explained above with respect to FIG. 3 as including a number of logical columns (318) including a column identifying sales campaigns (106) and a column identifying display templates (108). The table (302) also includes logical rows (316). Each row in this example associates a sales campaign (106) and a display template (108) that also associates at least one sales campaign question (110, 308, 312) and an answer form (112, 310, 314) for the question.

The method of FIG. 4 also includes displaying (406) by the leadership hub (134) and the campaign management portal (114) a template (108) as an overlay (148) on a web page (144) of a CRM (104). A tele-agent runs a browser (148) on a computer such as laptop (126). The browser is navigated to a web page (144) of a web app exposed by a client CRM (104). The browser runs a pre-installed extension (146) that is capable of displaying a template (108) with questions and answer forms, retrieving actual answers, and providing actual answers to the agent hub for storage. Through the extension (146), the agent logs on to the agent hub, which provides the agent's ID to the leadership hub (134). The leadership hub identifies to the campaign management portal (114) a campaign on which the agent is authorized to work. The campaign management portal provides to the agent hub a template for the identified campaign. The agent hub provides the template to the browser extension. The tele-agent uses the contents of the template to communicate with prospects, purchasers, and other customer representatives. Thus, the leadership hub and the campaign management portal coordinate by use of the agent hub the display of the template.

Figure 5:
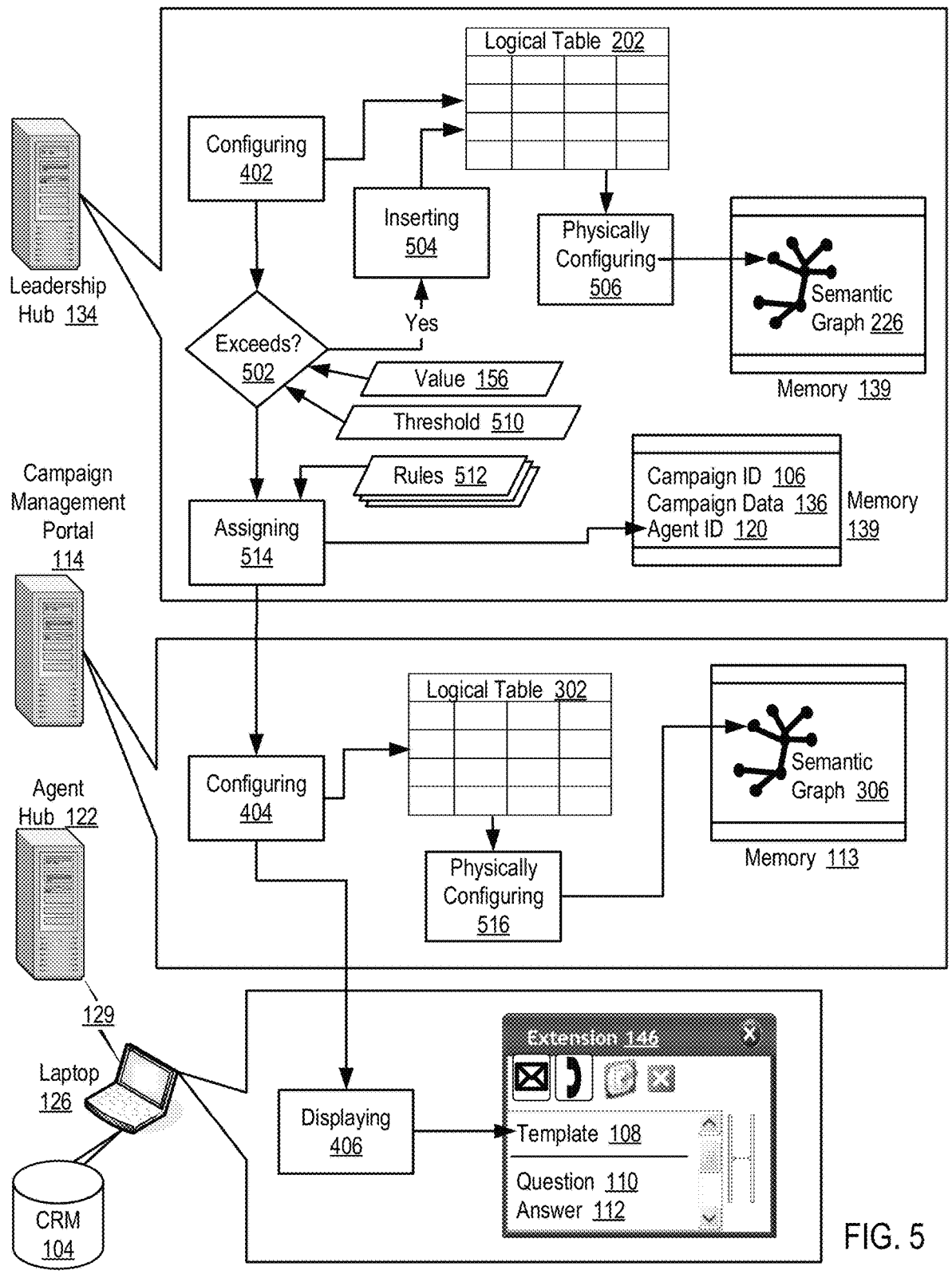

For further explanation, FIG. 5 sets forth a flow chart illustrating a further example method of agnostically augmenting a CRM application according to embodiments of the present invention. The method of FIG. 5 is similar to the method of FIG. 4, including as it does configuring (402) computer memory of a leadership hub (134) according to a logical table (202), configuring (404) computer memory (113) of a campaign management portal (114) according to a logical table (302), and displaying (406) a template (108) as an overlay on a web page of a CRM (104).

The method of FIG. 5, however, also includes physically configuring (506) by the leadership hub (134) the identifications of sales campaigns (106 on FIG. 2) and tele-agents (128, 210, 212 on FIG. 2) as a semantic graph (226) in the computer memory (139) of the leadership hub (134) and physically configuring (516) by the campaign management portal (114) the identifications of sales campaigns (106 on FIG. 3) and display templates (108 on FIG. 3), including sales campaign questions (110, 308, 312 on FIG. 3) and answer forms (112, 310, 314 on FIG. 3), as a semantic graph (306) in the computer memory (113) of the campaign management portal (114). Thus, the leadership hub and the campaign management portal both have available when needed both the benefits of logical tables and the benefits of semantic graphs.

The method of FIG. 5 also includes inserting (504), when a lead qualification value (156) exceeds (502) a predetermined threshold (510), in computer memory of the leadership hub a new logical row for a new campaign. Lead qualification values can include, for example, BANT values (Budget Authority Need Timing), CHAMP values (Challenges Authority Money Prioritization), SPIN values (Situation Problem Implication Need-payoff), NEAT values (Need Economic impact, Access to authority, Timeline), MEDDIC values (Metrics, Economic buyer, Decision criteria, Decision process, Identify pain, Champion), and so on.

Lead qualification values can be maintained as part of routine data processing in a sales organization's internal CRM application (102 on FIG. 1) of a sales organization. A value exceeding a threshold can trigger a message to a leadership hub to create a new campaign for a client for a product. The campaign may need additional processing before going active, assignment of resources, perhaps client approval or management approval, but the initial creation of the campaign can be triggered by a lead qualification value.

The method of FIG. 5 also includes assigning (514) by the leadership hub according to business rules (512) an agent (120) to a campaign (106). In this example, the assigning is automated within the hub as naturally following the creation (504) of a new campaign. Examples of business rules include:

assigning an agent whose experience and education match the products that are the subjects of a campaign,
assigning an agent as a portion of the agent's availability so that the total assignment of the agent's availability across all campaigns to which the agent is assigned does not exceed 100%,
and so on.

Figure 6:
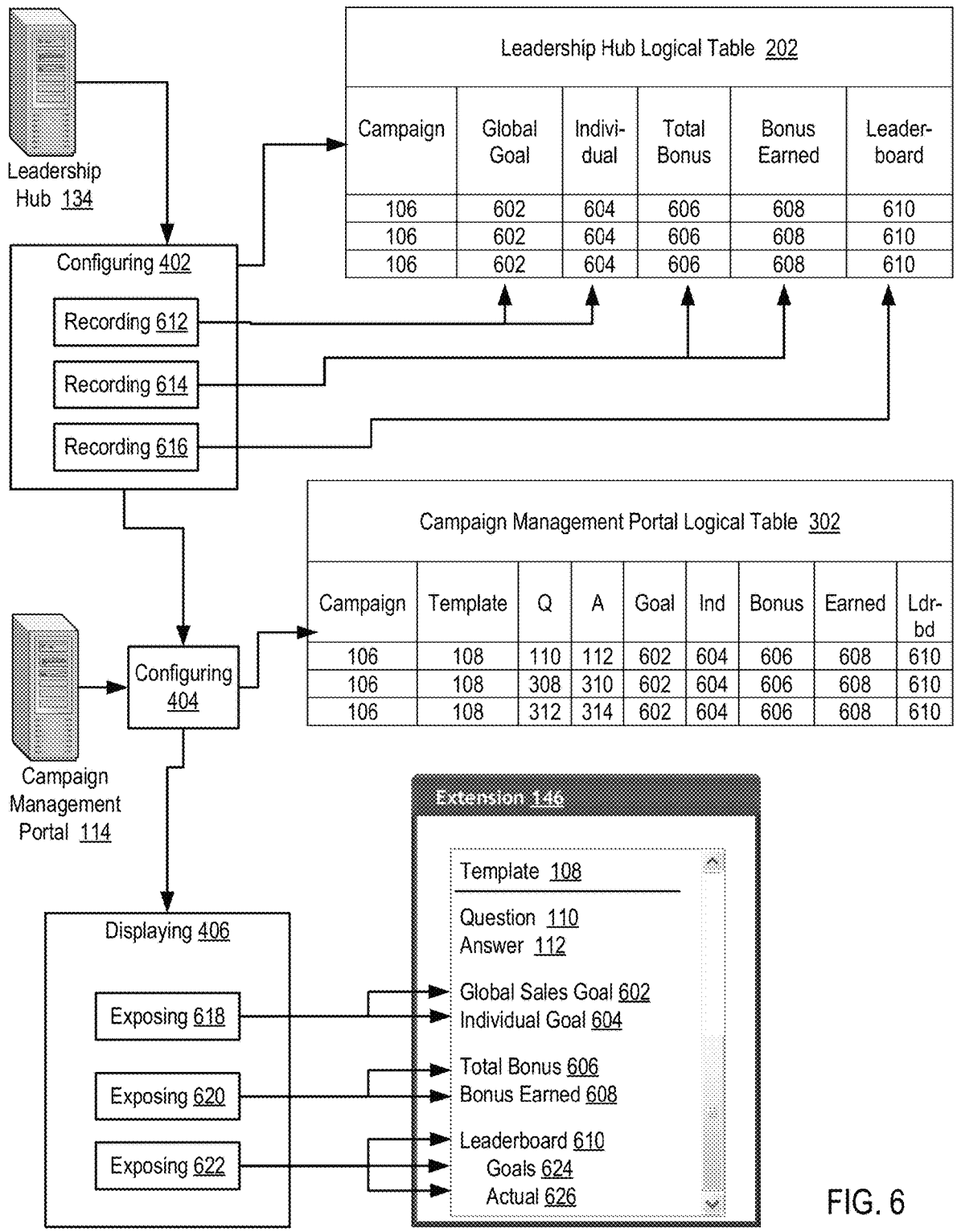

For further explanation, FIG. 6 sets forth a flow chart illustrating a further example method of agnostically augmenting a CRM application according to embodiments of the present invention. The method of FIG. 6 is similar to the method of FIG. 4, including as it does configuring (402) computer memory of a leadership hub (134) according to a logical table (202), configuring (404) computer memory (113) of a campaign management portal (114) according to a logical table (302), and displaying (406) a template (108) as an overlay on a web page of a CRM (104).

The method of FIG. 6, however, also includes recording (612) by the leadership hub (134) as campaign data a global sales goal (602) for a campaign and an individual goal (604) for a tele-agent assigned to work on the campaign, and exposing (618) to the tele-agent through the template (108) both the global sales goal (602) for the campaign and the individual goal (604) for the tele-agent. Examples of sales goals include sales revenue, revenue by product or product line, percentage of revenue from new business, and so on. The method of FIG. 5 also includes recording (614) by the leadership hub as campaign data a total performance bonus (606) for the agent for a campaign and the portion (608) of the total earned by the agent, and exposing (620) to a tele-agent through the template (108) both the total performance bonus (606) for the agent for the campaign and the portion (608) of the total earned by the agent.

The method of FIG. 6 also includes recording (616) by the leadership hub as campaign data a leaderboard (610) comprising performance goals (624) for each agent assigned to the campaign and actual performance (626) by each agent, and exposing (622) to all tele-agents assigned to the campaign the leaderboard (610), including both the performance goals (624) for each agent and actual performance (626) by each agent. The notion of leaderboard goals in some embodiments at least is broader than sales or bonus, including, for example, number of calls made, emails sent, number of conversations, social media interactions, meetings scheduled, demos or sales presentations, proposals sent, opportunities closed, new opportunities added to a sales pipeline, lead response time, leads qualified, email open rate, email response rate, and so on, and so on, the point of the leaderboard being to show overall performance for a team, all the agents assigned to a campaign.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. Automated computing machinery that agnostically augments a customer relationship management ("CRM") application, the machinery comprising:
   a leadership hub comprising a module of the automated computing machinery configured with computer memory configured according to a first logical table, the first logical table comprising a plurality of logical columns including a column identifying sales campaigns and a column identifying tele-agents, the table further comprising a plurality of logical rows, each row representing an assignment of a tele-agent to work on a sales campaign; and
   a campaign management portal comprising a further module of the automated computing machinery operatively coupled for data communications to the leadership hub, the campaign management portal configured with computer memory configured according to a second logical table, the second logical table comprising a plurality of logical columns including a column identifying sales campaigns and a column identifying display templates, the logical table further comprising a plurality of logical rows, each row associating a sales campaign and a display template comprising at least one sales campaign question and an answer form for the question;
   the leadership hub and the campaign management portal operative to:
      display the template as an overlay of a web page of a CRM; wherein the overlay is a graphical user interface (GUI) under control of an extension of a browser displaying the web page of the CRM, and invoke a GUI control widget of the extension to remove the overlay from a window of the browser and display the overlay in the window of the browser,
   wherein each of the leadership hub and the campaign management portal is external to the CRM application, and the automated computing machinery augments the CRM application through one or more web applications independently of a structure or function of the CRM application.

2. The machinery of claim 1 wherein the template displayed as the overlay comprises the template capable of being overlaid in a same form across all web pages of all CRMs that are implemented as web applications.

3. The machinery of claim 1 wherein neither the hub nor the portal comprise any data regarding the structure or function of the CRM.

4. The machinery of claim 1 further comprising the leadership hub further configured for each sales campaign with computer memory of a campaign name, identity of a client for whom the campaign is implemented, roles of persons assigned to work on the campaign, duration of the campaign, geographic scope of the campaign, and products for sale in the campaign.

5. The machinery of claim 1 wherein:
   the identifications of the sales campaigns and the tele-agents in the leadership hub are physically configured as a first semantic graph in the computer memory of the leadership hub; and
   the identifications of the sales campaigns and the display templates, including sales campaign questions and answer forms, are physically configured as a second semantic graph in the computer memory of the campaign management portal.

6. The machinery of claim 1 wherein:

the identifications of sales campaigns and tele-agents in the leadership hub are physically configured as semantic triples in the computer memory of the leadership hub; and the identifications of sales campaigns and display templates, including sales campaign questions and answer forms, are physically configured as semantic triples in the computer memory of the campaign management portal.

7. The machinery of claim 1 wherein:

the identifications of sales campaigns and tele-agents in the leadership hub are physically configured as semantic triples in contiguous segments of the computer memory of the leadership hub; and the identifications of sales campaigns and display templates, including sales campaign questions and answer forms, are physically configured as semantic triples in contiguous segments of the computer memory of the campaign management portal.

8. A computer-implemented method of agnostically augmenting a customer relationship management ("CRM") application, the method comprising:

configuring by a leadership hub computer memory of the hub according to a first logical table, the first logical table comprising a plurality of logical columns including a column identifying sales campaigns and a column identifying tele-agents, the table further comprising a plurality of logical rows, each row representing an assignment of a tele-agent to work on a sales campaign, the leadership hub comprising a module of automated computing machinery;

configuring by a campaign management portal computer memory of the portal according to a second logical table, the second logical table comprising a plurality of logical columns including a column identifying sales campaigns and a column identifying display templates, the logical table further comprising a plurality of logical rows, each row associating a sales campaign and a display template comprising at least one sales campaign question and an answer form for the question, the campaign management portal comprising a module of automated computing machinery operatively coupled for data communications to the leadership hub;

displaying by the leadership hub and the campaign portal the template as an overlay on a web page of a CRM; wherein the overlay is a graphical user interface (GUI) under control of an extension of a browser displaying the web page of the CRM; and invoking a GUI control widget of the extension to remove the overlay from a window of the browser and display the overlay in the window of the browser, wherein each of the leadership hub and the campaign management portal is external to the CRM application, and the CRM application is agnostically augmented through one or more web applications independently of a structure or function of the CRM application.

9. The method of claim 8 wherein displaying further comprises displaying the template as the overlay in a same form across any web page of any CRM that is implemented as a web application.

10. The method of claim 8 further comprising:

physically configuring by the leadership hub, the identifications of sales campaigns and tele-agents as a first semantic graph in the computer memory of the leadership hub; and physically configuring by the campaign management portal, the identifications of sales campaigns and display templates, including sales campaign questions and answer forms, as a second semantic graph in the computer memory of the campaign management portal.

11. The method of claim 8 further comprising inserting, when a lead qualification value exceeds a predetermined threshold, by the leadership hub in computer memory of the leadership hub a new logical row for a new campaign.

12. The method of claim 8 further comprising assigning by the leadership hub according to business rules an agent to a campaign.

13. The method of claim 8 further comprising:

recording by the leadership hub as campaign data a global sales goal for a campaign and an individual goal for a tele-agent assigned to work on the campaign; and exposing to the tele-agent through the template both the global sales goal for the campaign and the individual goal for the tele-agent.

14. The method of claim 8 further comprising:

recording by the leadership hub as campaign data a total performance bonus for the tele-agent for a campaign and a portion of a total earned by the agent; and exposing to a tele-agent through the template both the total performance bonus for the agent for the campaign and the portion of the total earned by the agent.

15. The method of claim 8 further comprising:

recording by the leadership hub as campaign data a leaderboard comprising performance goals for each agent assigned to the campaign and actual performance by each agent; and exposing to all tele-agents assigned to the campaign the leaderboard, including both the performance goals for each agent and actual performance by each agent.

* * * * *